(12) United States Patent
Cherkauer et al.

(10) Patent No.: US 7,711,713 B2
(45) Date of Patent: May 4, 2010

(54) SYSTEM FOR DETERMINISTIC DATABASE RECOVERY TIME (75) Inventors: Kevin James Cherkauer, Portland, OR (US); Scott David Lashley, Portland, OR (US); Roger C. Raphael, Sunnyvale, CA (US); Jason Christopher Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 10/972,160

(22) Filed: Oct. 21, 2004

(65) Prior Publication Data

US 2006/0101083 A1 May 11, 2006

(51) Int. Cl.
*G06F 17/00* (2006.01)
(52) U.S. Cl. ........................... 707/686; 707/826
(58) Field of Classification Search .................. None
See application file for complete search history.

(56) References Cited

U.S. PATENT DOCUMENTS

| | | |
|---|---|---|
| 5,574,897 A | 11/1996 | Hermsmeier et al. |
| 5,625,820 A | 4/1997 | Hermsmeier et al. |
| 5,758,359 A * | 5/1998 | Saxon .................. 707/204 |
| 6,202,071 B1 | 3/2001 | Keene |
| 6,351,754 B1 * | 2/2002 | Bridge et al. ........... 707/202 |
| 6,377,959 B1 * | 4/2002 | Carlson ................. 707/202 |
| 6,560,615 B1 | 5/2003 | Zayas et al. |
| 6,584,473 B2 | 6/2003 | Kimura et al. |
| 7,020,599 B1 * | 3/2006 | Cao et al. ............... 703/22 |
| 2003/0084372 A1 | 5/2003 | Mock et al. |
| 2003/0163489 A1 * | 8/2003 | Tonack et al. ........... 707/200 |
| 2004/0139302 A1 * | 7/2004 | Flautner et al. ......... 712/220 |

* cited by examiner

*Primary Examiner*—Neveen Abel-Jalil
*Assistant Examiner*—Son Hoang
(74) *Attorney, Agent, or Firm*—Lieberman & Brandsdorfer, LLC (57) ABSTRACT

A system for limiting the amount of time for a database server to perform a crash recovery process. A maximum recovery time for the database server to perform the crash recovery process is specified. An estimated recovery time for the crash recovery process that is less than the maximum recovery time is calculated, based on at least one of a deterministic analysis of cost accumulation during prior instances of the crash recovery process or an empirical analysis of cost accumulation during regular transaction processing in the database server. The crash recovery process is then conformed to the estimated recovery time.

17 Claims, 8 Drawing Sheets

SYSTEM FOR DETERMINISTIC DATABASE RECOVERY TIME

BACKGROUND OF THE INVENTION

1. Field of the Invention

The present invention relates to data processing apparatus and methods for the storage and retrieval of data stored in computerized database management systems. More particularly, the invention relates to deterministically controlling the recovery of the data after a crash has disrupted the system.

2. Description of the Prior Art

A major problem today is providing high availability (HA) of database management system (DBMS) to its users. Increasingly, organizations with DBMSs, such as banks, brokerages, e-tailers, etc., are finding that they cannot tolerate long outages while a DBMS is unavailable or only available at a reduced performance level.

There are two aspects to this problem. The obvious first is the prevention of disruptions or "crashes" of a DBMS to begin with. This is significant, but it is not the subject of this discussion. Rather, we here address the second aspect, the pragmatic fact that disruptions in a DBMS will occur and that the DBMS needs to be recovered rapidly to its full performance level.

Figure 1:
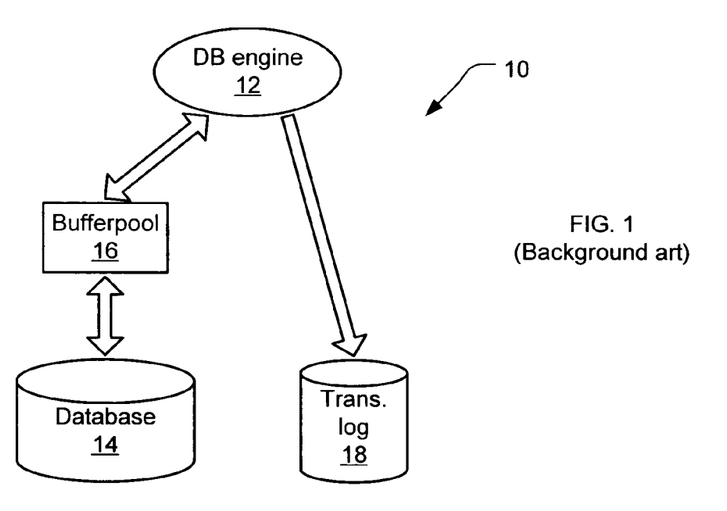
FIG. 1 (background art) is a block diagram conceptually depicting the basic elements and operation of a representative database management system (DBMS).

FIG. 1 (background art) is a block diagram conceptually depicting the basic elements and operation of a representative DBMS 10. The DBMS 10 includes a database engine 12, a database 14, a buffer pool 16, and a transaction log 18. In operation, pages of data are "paged into" and "paged out" of the buffer pool or cache memory. A "page fault" occurs when a page to be paged into the buffer pool 16 because it is not already there. When a page contains updates that are not yet recorded in the database 14 it is a "dirty page." The operation of paging out a dirty page from the buffer pool 16 into the database 14 is often referred to as "flushing." Conversely, when a page with no updates is paged out, this operation is often referred to as "replacing." Page faults and having to flush dirty pages are generally undesirable because they slow down operation of the DBMS 10.

The buffer pool 16 resides in high speed, volatile memory and the rationale for using it, rather than simply working directly with the database 14, is to increase the efficiency of the DBMS 10 based on the principles of probability. If the DBMS 10 is being used by an application to perform a query or to update a record in a page, that page is likely to contain other records that will soon also be the subject of queries or updates. Accordingly, it is usually desirable to not page out a page after a query or update finishes with it, but rather to retain it in the buffer pool 16 until it has not been accessed for some period of time or until the application using it ends.

Of particular present interest, when an update is performed the database engine 12 needs to page out dirty pages at some point and this is where things get complicated. Unplanned disruptions in the DBMS 10 can occur, causing the contents of the buffer pool 16 to not get properly flushed to the database 14. Such an event is termed a "crash" and the process of restoring the data stored in the database 14 to a transactionally consistent state after such a crash is often referred to as "crash recovery."

To facilitate crash recovery, a logical representation of each of the updates applied to the pages in the buffer pool 16 is entered into a transaction log 18 that resides in persistent storage. In the unfortunate even of a crash, the transaction log 18 can be replayed to redo all of the committed updates that were applied to pages in the buffer pool 16 but not flushed to the database 14. If there is a large number of records in the transaction log 18 to replay during crash recovery or if the records are expensive in terms of system resources to replay, crash recovery can take a long time.

Figure 2:
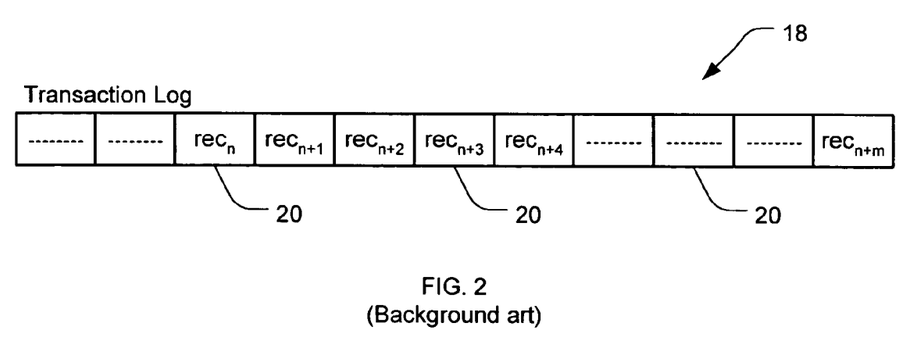
FIG. 2 (background art) is a block diagram depicting the transaction log of FIG. 1 as a series of log records.

FIG. 2 (background art) is a block diagram depicting the transaction log 18 as a series of log records 20. Here, "$rec_n$" represents the log record 20 that dirtied the oldest unflushed page in the buffer pool 16 and the series "$rec_n, rec_j, \ldots rec_{n+m}$" then represent log records 20 that need to be replayed.

In passing, it should be noted that recovery time after a crash also includes time to roll back any uncommitted transactions that were open at the time of the crash, but this time is generally negligible compared to the time to do the roll forward portion of recovery. This is because in online transaction processing (OLTP) systems, transactions tend to be very short, so only a few seconds worth of rollback is needed, while in decision support systems (DSS), transactions tend to be long but also read-only, and read-only transactions do not generate any log records and require no rollback.

Various technologies have been developed in attempts to improve crash recovery handling. For example, U.S. Pat. No. 5,625,820 and U.S. Pat. No. 5,574,897 by Hermsmeir et al. disclose methods wherein a user chooses a length of time (an external threshold) that he or she is willing to spend recovering a database, and the system dynamically manages the logging of objects to meet this demand. The available CPU to run the process, the number of I/Os the process generates, and the quantity of lock wait time are taken into consideration. The shorter the time the user chooses the more objects the system will log, but the more the system performance is otherwise degraded in a tradeoff for this. As such, these references teach resource management to achieve a desired recovery time, but where resource management is rigid.

U.S. Published App. No. 2003/0084372 by Mock et al. discloses a Method and apparatus for data recovery optimization in a logically partitioned computer system. This is a method wherein a user may specify the maximum recovery time which can be tolerated for compiled data in a computer system having dynamically configurable logical partitions, and a protection utility manages the logging of indexes so that this maximum recovery time is not exceeded yet unnecessary logging is not performed. The compiled data may be multiple database indexes, which are selectively logged to reduce recovery time. Logging is selectively discontinued or extended responsive to changes in partition configuration, allowing a gradual migration to the target recovery time using the new set of configured resources. As such, however, this invention address recompiling database indexes, rather than the whole process of database recovery, and this invention does this in the context of computer system having dynamically configurable logical partitions.

U.S. Pat. No. 6,351,754 by Bridge, Jr. et al. discloses a method for controlling recovery downtime. A checkpoint value is maintained that indicates which records of a plurality of records have to be processed after the failure. The target checkpoint value is determined by calculating a maximum number of records that should be processed after the failure. As such, however, this approach is not deterministic and its checkpoint value may result in an undue allocation of system resources because of this.

U.S. Pat. No. 5,758,359 discloses a method for performing retroactive backups in a computer system. The retroactive backup mechanism employs a backup policy dictating that certain backups are to be performed at set times and for set backup levels. The total size of a save set is compared to the maximum size threshold and the backup is activated when the threshold is reached. As such, however, this approach is also clearly not deterministic.

In view of the current state of affairs, however, the present inventors determined that the users of DBMSs who have high availability (HA) requirements would still benefit greatly from the ability to specify a maximum crash recovery time ($R_{max}$) that they are willing to tolerate, and to then have the DBMS more efficiently automatically adjust its work of flushing dirty pages to the database after a crash as needed to guarantee that $R_{max}$ will not take longer than specified.

SUMMARY OF THE INVENTION

Briefly, one preferred embodiment of the present invention is a method for limiting the amount of time for a database server to perform a crash recovery process. A maximum recovery time for the database server to perform the crash recovery process is specified. An estimated recovery time for the crash recovery process is calculated that is less than the maximum recovery time, with the estimated recovery time based on one of both of a deterministic analysis of cost accumulation during prior instances of the crash recovery process or an empirical analysis of cost accumulation during regular transaction processing in the database server. The crash recovery process is then conformed to the estimated recovery time.

Briefly, another preferred embodiment of the present invention is a method for updating an estimated recovery time to perform crash recovery in a database management system as a log record is generated during transaction processing. A record type for the current log record is determined, and an estimated record cost for that record type is retrieved from a set of pre-stored statistical data. This estimated record cost is then added to the estimated recovery time.

Briefly, another preferred embodiment of the present invention is a method for updating an estimated recovery time to perform crash recovery in a database management system after a dirty page is flushed by a page flusher. An estimated page cost for the dirty page is retrieved from a pre-stored set of the estimated page costs, where such an estimated page cost is based on either or both of a deterministic analysis of cost accumulation during prior instances of crash recovery in the database management system or an empirical analysis of cost accumulation during regular transaction processing in the database management system. The estimated page cost is then subtracted from the estimated recovery time.

It is an advantage of the present invention that it permits a user to deterministically set a "wall-clock" upper bound for crash recovery process times, particularly where high database availability is desired or needed.

It is another advantage of the present invention that it has flexible adaptability to needs across a wide range of database management systems as well as adaptability to be optimized when employed in individual database management systems. A deterministic analysis of cost accumulation during prior instances of crash recovery can be used, or an empirical analysis of cost accumulation during regular transaction processing can be used. Or both can be used. Other parameters can similarly be experimented with, for instance, the numbers ("granularity") of or classes ("categorizations") of record types can be changed and the effects analyzed. Deciding between two approaches in a particular case can thus be based on testing to see how accurate the estimates are for different configurations and the actual evidence as more recoveries are performed.

And it is another advantage of the present invention that the advantage in the adaptability achieved when this system/method is employed in individual database management systems and deployed on the multitude hardware platforms and storage subsystem that differ in performance. In other words the system adapts to the varying performance dimension of different hardware that the database management systems sit on to provide the optimal tradeoff of transaction rate and recovery time.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

In the various figures of the drawings, like references are used to denote like or similar elements or steps.

DETAILED DESCRIPTION OF THE PREFERRED EMBODIMENTS

The present invention provides methods and apparatus to provide a deterministic database recovery time. As illustrated in the various drawings herein, and particularly in the view of FIG. 3, embodiments of the invention are depicted by the general reference character 50.

Figure 3:
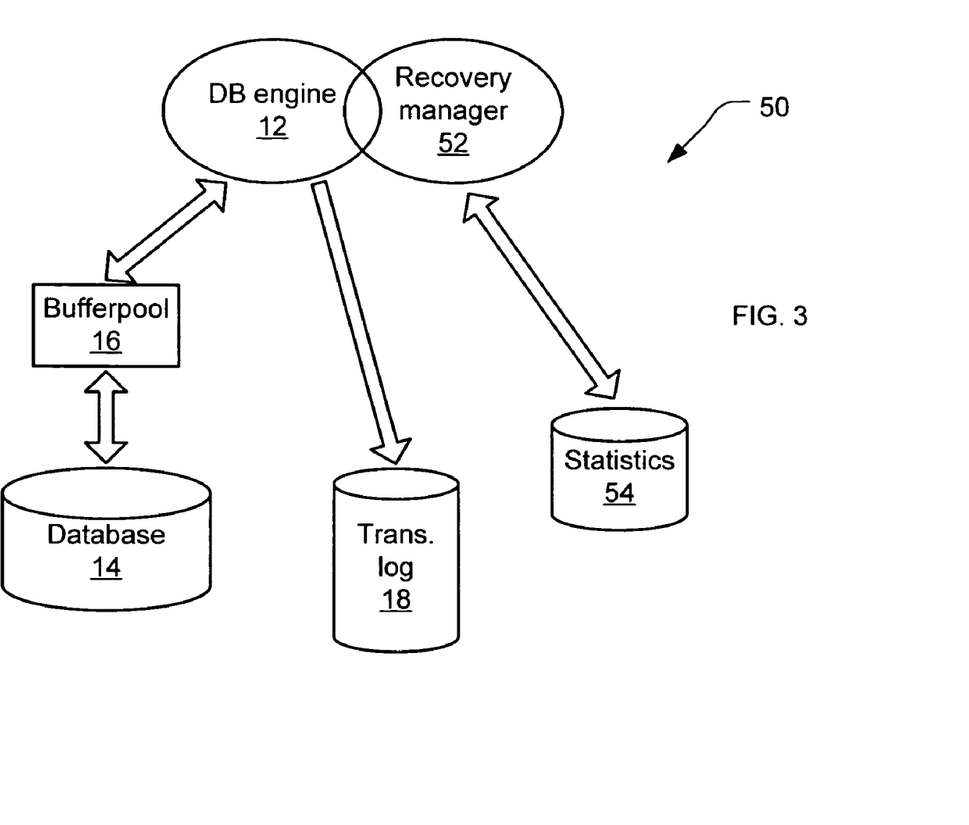
FIG. 3 is a block diagram depicting an overview of how the inventive crash recovery system (CR system) can be added to a DBMS, such as that of FIG. 1.

FIG. 3 is a block diagram depicting an overview of how the inventive crash recovery system (CR system 50) can be added to a database management system (DBMS), such as the DBMS 10 of FIG. 1 (background art). As can be seen, the major features of the CR system 50 are a recovery manager 52 and statistical data 54.

The CR system 50 provides the users of the DBMS 10 with the ability to specify a maximum time ($R_{max}$) that they are willing to tolerate for performing crash recovery. Using the CR system 50, the DBMS 10 is made able to automatically adjust its workload as needed to guarantee that $R_{max}$ is not exceeded. The CR system 50 permits this with a very high degree of accuracy—much higher than is possible with other techniques, such as hardwired time estimates, that do not collect statistics from actual recoveries or accumulate estimated recovery times based on such statistics during transaction processing.

Figure 4:
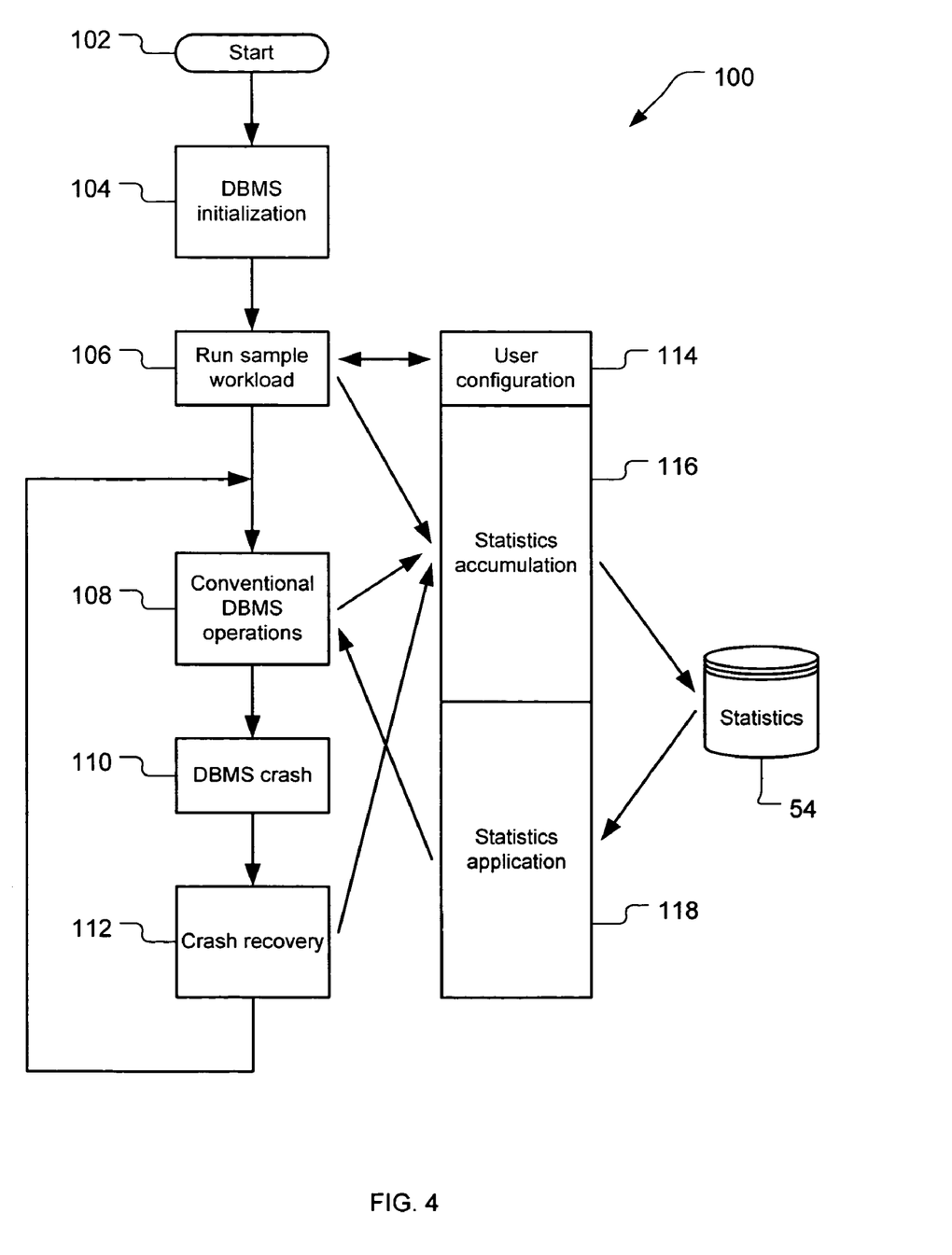
FIG. 4 is a chart, nominally in the manner of a flow chart, providing a basic overview of a process for crash recovery in accord with the present invention.

FIG. 4 is a chart, nominally in the manner of a flow chart, providing a basic overview of a process 100 for crash recovery in accord with the present invention. In a step 102 the process 100 starts, and in a step 104 general initialization of the DBMS 10 is performed. In an optional step 106, described in detail presently, a small sample workload can be run on the DBMS 10 by the CR system 50.

In a step 108 the DBMS 10 performs conventional operations, as required for whatever end application or applications the DBMS 10 is being employed for. In a step 110, as is the unfortunate course of affairs over time, the DBMS 10 crashes. Accordingly, in a step 112 the DBMS 10 undergoes crash recovery. And step 108 is then returned to, where the DBMS 10 carries on, potentially going through this scenario forever.

As described so far, steps 102, 104, and 108-112 are normal operations in an entirely conventional DBMS. The addition of the CR system 50, however, changes this. In accordance with the present invention, step 108 is modified so that it uses statistics generated by the CR system 50 to compute estimated crash recovery time $R_{est}$ and dynamically select a flushing algorithm to maintain $R_{est}$ as less than or equal to $R_{max}$. Step 108 may also be modified to contribute inputs of time needed to perform individual transactional steps to statistics accumulation 116 discussed below.

In a step 114 the CR system 50 performs user configuration. This can be as little as specifying a value for $R_{max}$, possibly even accepting an out-of-the box default value. One value can be provided, or multiple representative values can be provided for different DBMS applications. This is merely a matter of embodiment design. Many embodiments of the CR system 50 can be expected to permit additional configuration to be performed. In particular, this will often include letting the user "seed" the CR system 50 with initial data to start with before it has had the opportunity to collect actual statistical data for the specific DBMS 10. Again as a matter of design, the CR system 50 can provide a single set of default initial seed data, or provide multiple representative sets from which the user can pick one, or the user can enter their own values to use. Alternately, in embodiments of the CR system 50 provided with this option, the user can let step 114 enable the optional step 106 and obtain "intelligent" seed data. This subject is covered further, below, after this overview discussion.

In a step 116 the CR system 50 accumulates statistics, storing these as the statistical data 54 in a persistent storage. In essence, this involves converting the seed data to actual data based on statistical analysis of the specific DBMS 10 in operation (i.e., data collected from step 106 if it was performed, and continually in step 108) and in crash recovery (i.e., prior instances of step 112). The accumulated statistics are applied continually during database operations (step 108) to update the estimated recovery time $R_{est}$ and adjust the flushing algorithm in order to maintain $R_{est}$ less than or equal to $R_{max}$.

In FIG. 4, steps 114-118 have been intentionally made adjacent to emphasize that they can work closely together. For example, without limitation, step 114 can be used to set $R_{max}$ to a different value at any time. It might, for instance, be desirable for an organization to reduce $R_{max}$ during a peak sales season, or to increase it while some hardware in the DBMS 10 is taken off-line for maintenance or upgrade. Such a new value for $R_{max}$ set in step 114 can then seamlessly be used by steps 116 and 118. The operations in steps 114-118 are now discussed in more detail.

The CR system 50 can work to assure that $R_{max}$ is not exceeded by using various mechanisms in steps 116 and 118, with increasing levels of sophistication as needed. One such increase in sophistication is for the CR system 50 to accumulate statistics in step 116 based on the amount of time taken to replay or rollback different types of log records during real crash recovery events (step 112). These statistics are preferably stored in the statistical data 54 and, over time, used to improve the accuracy of the CR system 50 as more recoveries are experienced. The statistics can be captured and kept at various granularities, e.g. coarse-grained ("on average, 10,000 log records can be replayed per minute") or fine-grained ("on average 8,000 inserts per minute, 12,000 updates per minute," etc.). The most accurate estimates are obtained with finer-grained statistics, but coarse-grained statistics can be used when the number of records that have been replayed or rolled back in actual recovery events is small, to reduce the errors due to small sample-size.

Figure 5:
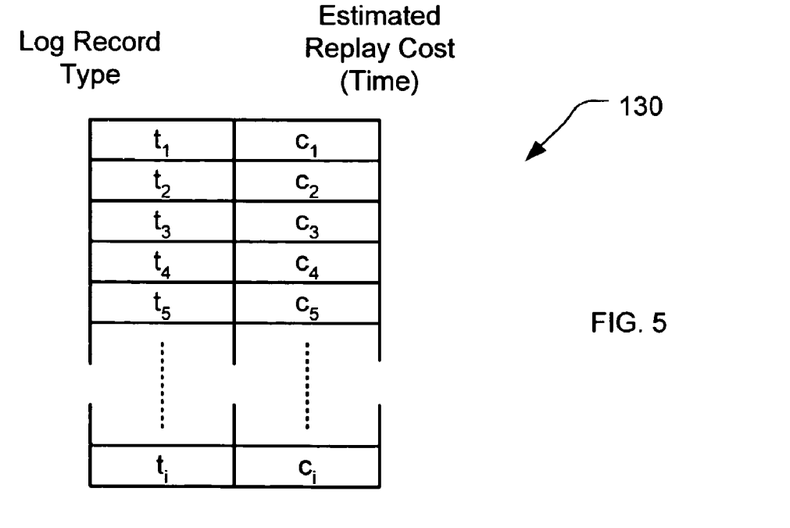
FIG. 5 is a block diagram depicting a costs table in which the types of log records are matched with respective estimated costs to replay an individual log record of the respective types.

FIG. 5 is a block diagram depicting a costs table 130 in which the types $(t_1, t_2, \ldots t_i)$ of log records 20 are matched with respective estimated costs $(c_1, c_2, \ldots c_i)$ to replay an individual log record 20 of the respective types. Such an estimated "record cost" includes the time to perform all of the recovery processing for a single record of the given type in the roll-forward recovery phase, i.e., reading the log record 20 from persistent storage, reading the pages it applies to from storage (if they are not already in the bufferpool 16), and applying the log record 20 if it is not already reflected in the pages.

These record cost statistics can be simple averages of the observed time to replay a given type of log record 20. Preferably, however, these can be more sophisticated, such as each being a decaying average where more recent examples of the times taken to replay given types of records are weighted more strongly, or where each is a sliding window is used to store average information for only a number of the most recent replays of each type of log record 20. Using such, more detailed, metrics permit the CR system 50 to adapt its estimates more quickly to changing workloads.

Figure 6:
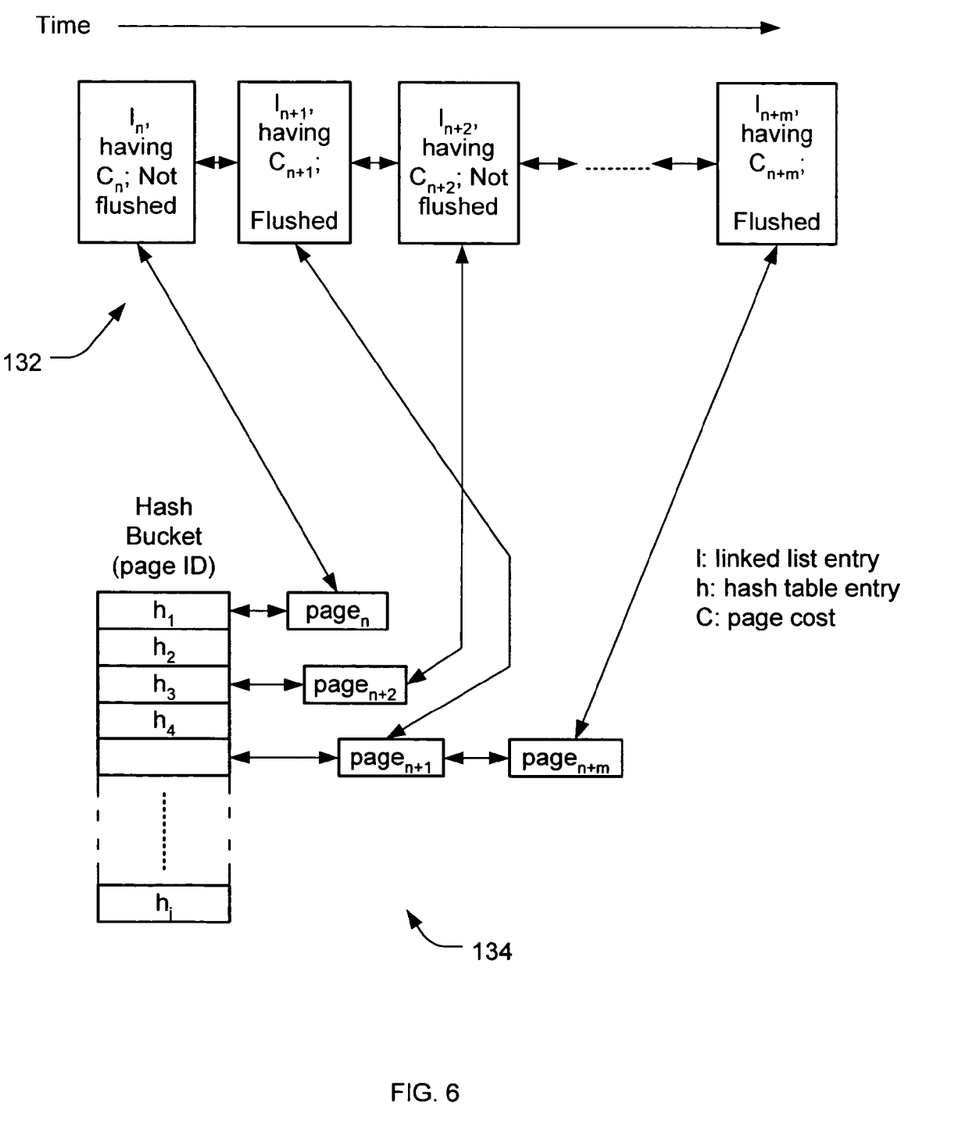
FIG. 6 is a block diagram depicting one approach to how the CR system can track the current estimated replay cost based on the costs table of FIG. 5 and other available data.

FIG. 6 is a block diagram depicting one approach to how the CR system 50 can track the current estimated replay cost, $R_{est}$, based on the costs table 130 of FIG. 5 and other available data. A double linked list 132 can be used to keep track of what contributes to $R_{est}$, where the individual list entries $(l_n, l_{n+1}, \ldots l_{n+m})$ in the linked list 132 represent the pages that may need to be processed in a crash recovery. Each list entry $(l_n, l_{n+1}, \ldots l_{n+m})$ includes an estimated "page cost" $(C_n, C_{n+1}, \ldots C_{n+m};$ note, uppercase "C") that is the sum of the estimated "record costs" (lowercase "c") for all of the individual records (r) that might need to be replayed for that page during a crash recovery. Along with the double linked list 132, a hash table 134 of hash buckets $(h_1, h_2, \ldots h_j)$ is provided, and populated based on the page identifiers used by the page flushers, to quickly find list entries (l) in the linked list 132.

Figure 7:
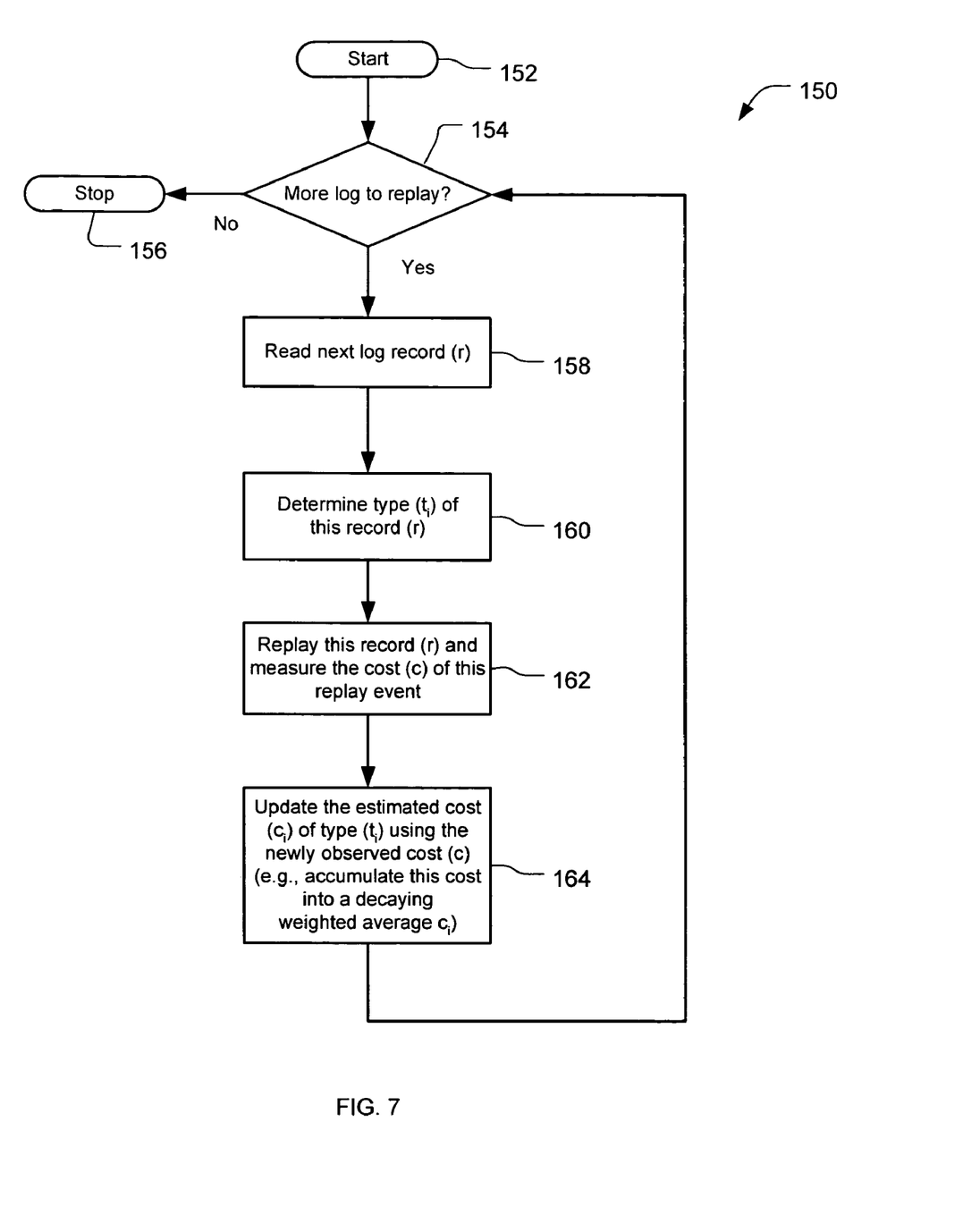
FIG. 7 is a flow chart depicting a process for updating the recovery cost estimates of various types of log records during a crash recovery.

FIG. 7 is a flow chart depicting a process 150 for updating the recovery cost estimates of various types (t) of log records 20 during recovery. The process 150 starts in a step 152, and in a step 154 a determination is made whether the transaction log 18 includes any log records 20 that need to be replayed. If not, in a step 156 the process 150 stops.

If there is part of the transaction log 18 yet to replay, in a step 158 the next log record 20 (r) is read and in a step 160 the type $(t_i)$ of this log record 20 is determined. Next, in a step 162 this log record 20 (r) is replayed and the cost (c) of this replay event is measured.

In a step 164 the estimated cost ($c_i$) for type ($t_i$) is updated based on the observed cost (c). The estimated cost ($c_i$) can simply be replaced with the observed cost (c), but a more sophisticated approach is to accumulate the just observed cost (c) into a weighted average of the estimated cost ($c_i$). After step 164, the process 150 returns to step 154.

Figure 8:
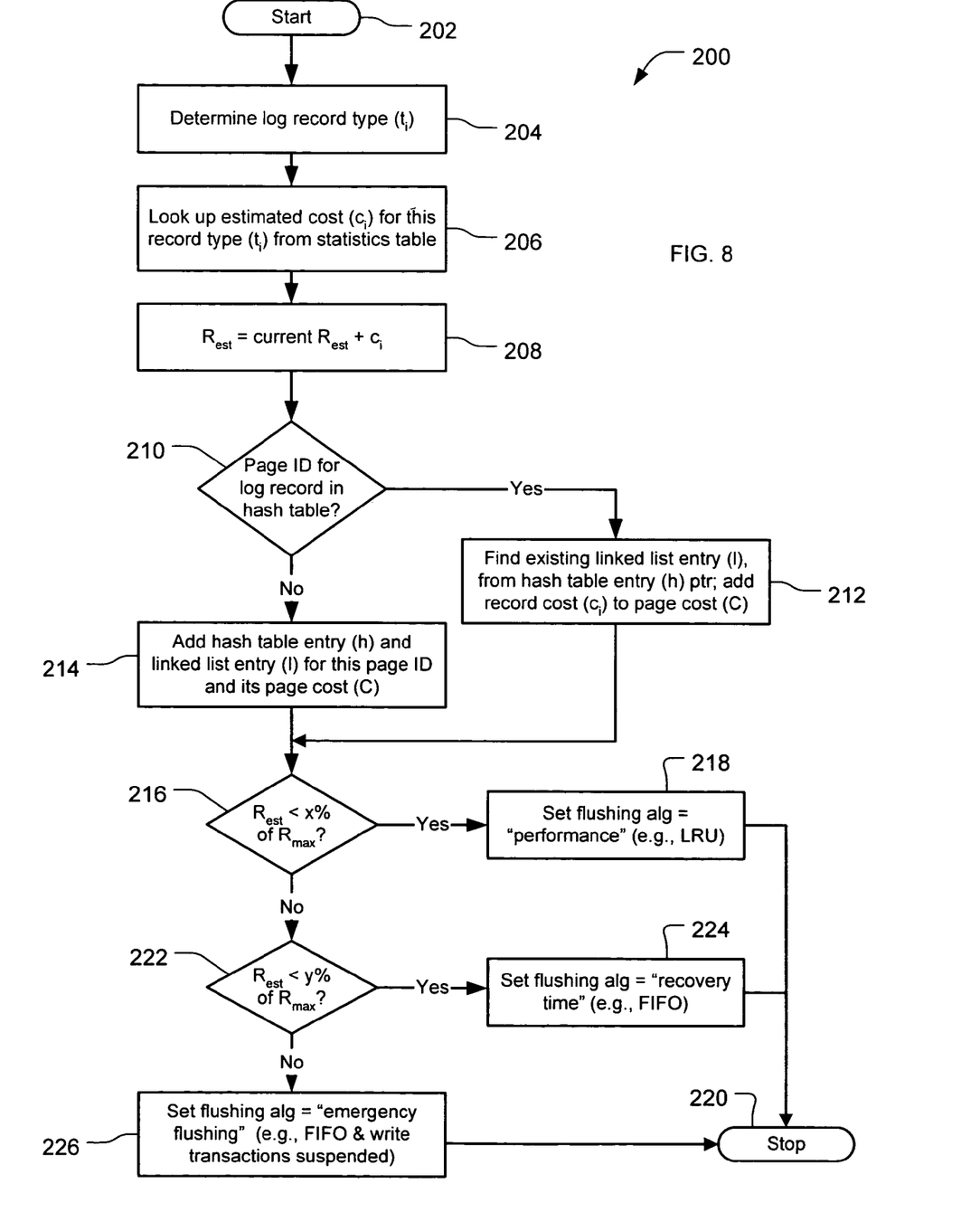
FIG. 8 is a flow chart depicting a process for updating the current estimated replay cost and the flushing algorithm when a new log record is generated during transaction processing.

FIG. 8 is a flow chart depicting a process 200 for updating $R_{est}$ and the flushing algorithm when a new log record 20 is generated during transaction processing. In a step 202 the process 200 starts. In a step 204 the type ($t_i$) of the present log record 20 is determined and in a step 206 the estimated cost ($c_i$) for a record of that type ($t_i$) is looked up in the statistical data 54. In a step 208 this estimated cost ($c_i$) is added to $R_{est}$, producing a new value for it.

In a step 210 a determination is made whether the page ID for the current log record 20 is present in the hash table 134. If so, in a step 212 the pointer in the hash table entry (h) is followed to the corresponding linked list entry (l) and the estimated record cost ($c_i$, a lowercase "c") for the current log record 20 is added to the page cost (C, uppercase "C") in that linked list entry (l). Otherwise, in a step 214 an entry (h) is added to the hash table 134 and an entry (l) is added to the linked list 132 with the estimated costs (C=$c_i$ here).

Next, in a step 216 a determination is made whether $R_{est}$ is less than a first pre-set percentage (x) of $R_{max}$. If so, in a step 218 the flushing algorithm is set to optimize performance and in a step 220 the process 200 stops.

Otherwise, in a step 222 a determination is made whether $R_{est}$ is less than a second pre-set percentage (y) of $R_{max}$. If so, in a step 224 the flushing algorithm is set to optimize recovery time and in step 220 the process 200 now stops.

And otherwise, in a step 226 the flushing algorithm is set for emergency flushing and in step 220 the process 200 stops.

Figure 9A:
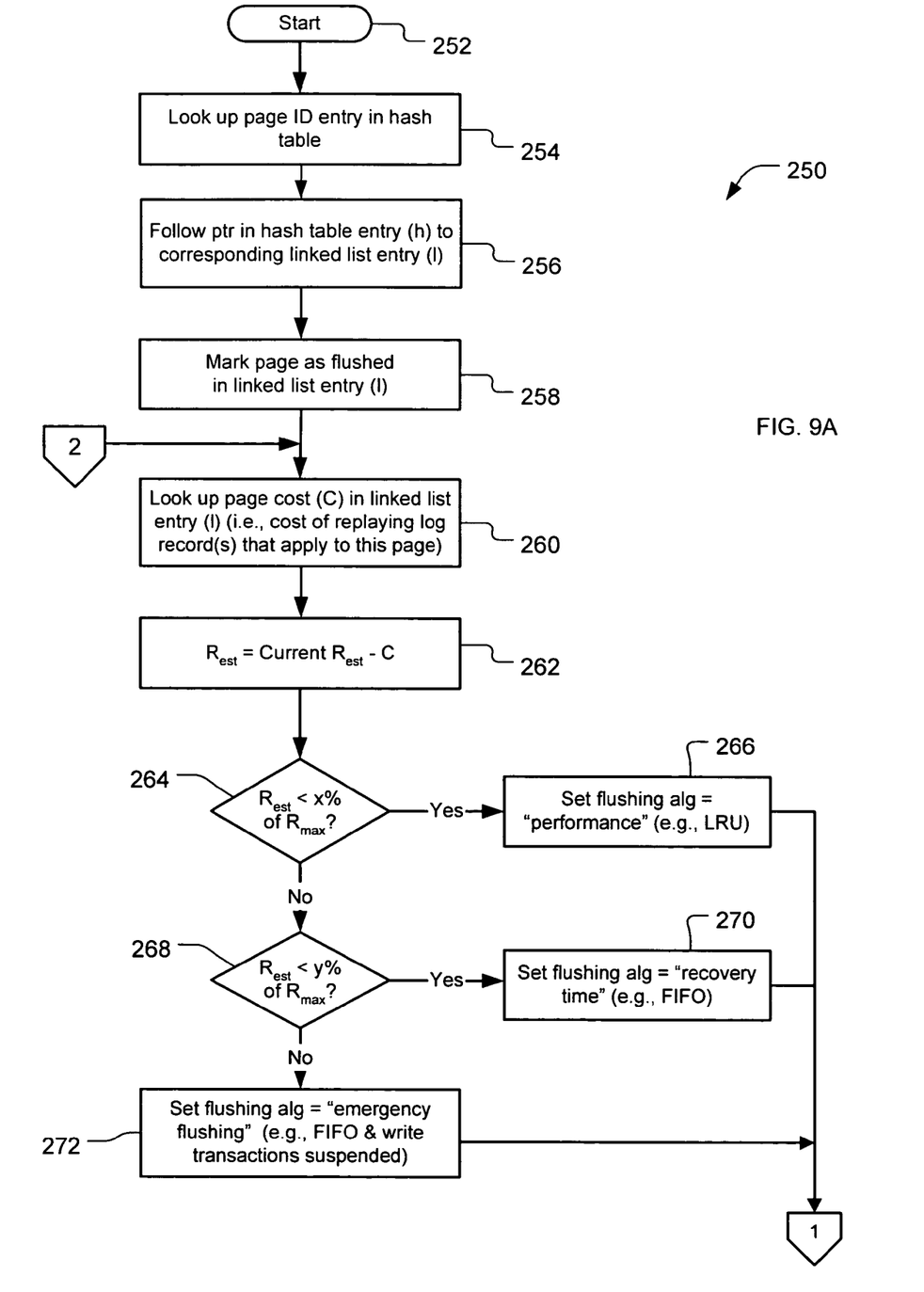
FIG. 9A-B is a flow chart depicting a process for updating the current estimated replay cost and the flushing algorithm after a dirty page is flushed by a page flusher.
Figure 9B:
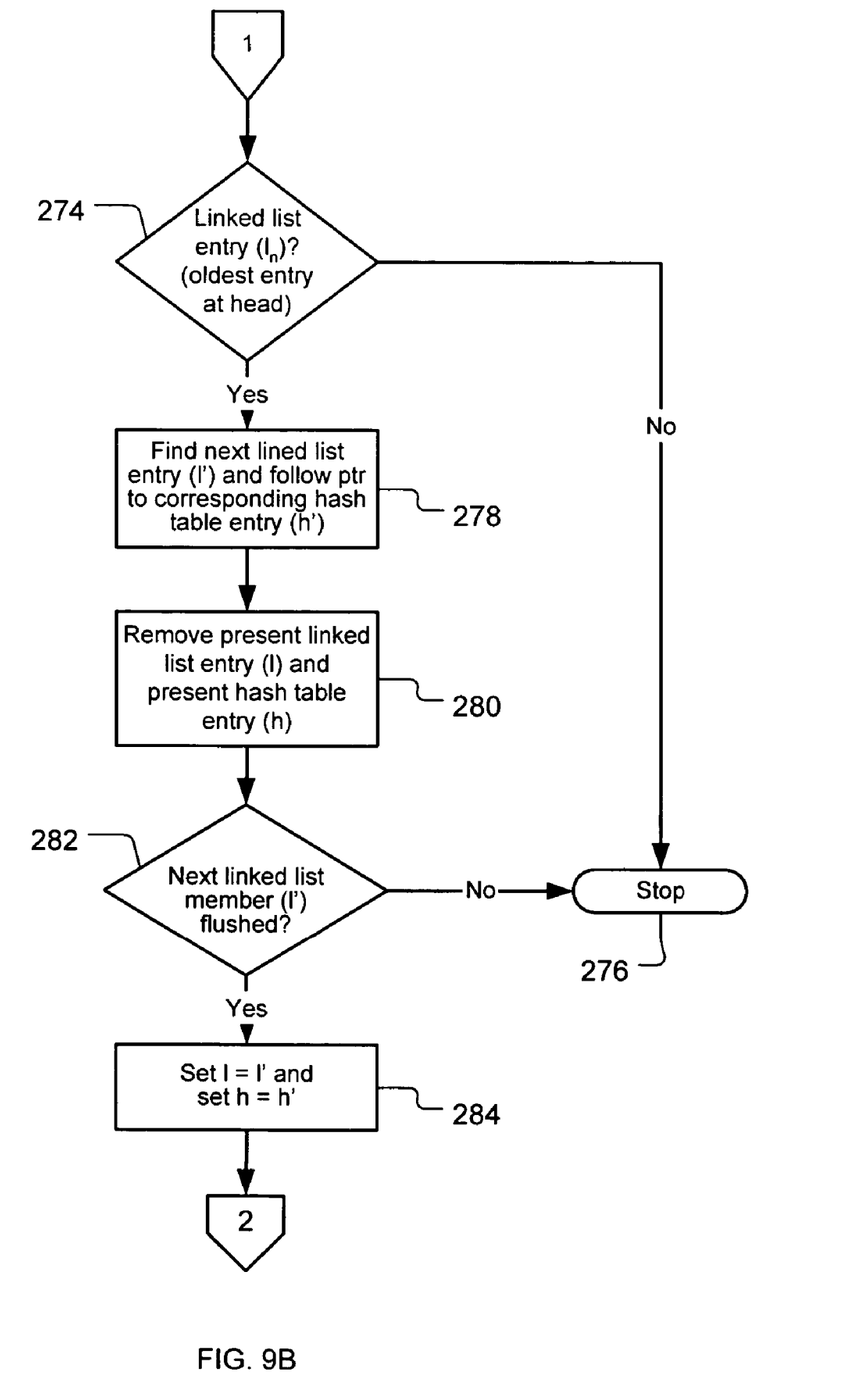

FIG. 9A-B is a flow chart depicting a process 250 for updating $R_{est}$ and the flushing algorithm after a dirty page is flushed by one of the page flushers.

In a step 252 the process 250 starts. In a step 254 the page ID is looked up in the hash table 134, in a step 256 the pointer in the hash table entry (h) for this page is followed to the corresponding link list entry (l), and in a step 258 this list entry (l) is marked as flushed.

In a step 260 the page cost (C) for this list entry (l) (i.e., the cost of replaying the log records 20 that apply to this page) is noted and in a step 262 this is subtracted from $R_{est}$, producing a new value for it.

Next, in a step 264 a determination is made whether $R_{est}$ is less than the first pre-set percentage (x) of $R_{max}$. If so, in a step 266 the flushing algorithm is set to optimize performance and the process 250 proceeds to step 274.

Otherwise, in a step 268 a determination is made whether $R_{set}$ is less than the second pre-set percentage (y) of $R_{max}$. If so, in a step 270 the flushing algorithm is set to optimize recovery time and the process 250 now proceeds to step 274.

And otherwise, in a step 272 the flushing algorithm is set for emergency flushing.

In step 274 (FIG. 9B) a determination is made whether the linked list entry (l) is at the head of the linked list 132 (i.e., whether it is the oldest entry). If not, in a step 276 the process 250 stops.

Otherwise, in a step 278 the next linked list entry (l') is found and the pointer in it is followed to the corresponding next hash table entry (h'). Then, in a step 280 the current list entry (l) is removed from the linked list 132 and the current hash table entry (h) is removed from the hash table 134.

In a step 282 a determination is made whether the "next" linked list entry (l') is already marked as flushed. If not, in step 276 the process 250 now stops.

Otherwise, in a step 284 the "next" linked list entry (l') is set to be the current linked list entry (l) and the next hash table entry (h') is set to be the current hash table entry (h), and the process 250 returns to step 260 and carries on from there.

Summarizing, the number of each type of log record that needs to be replayed can be kept track of by maintaining an in-memory data structure, such as a linked list of the types that have been generated, in the same order as they were generated, as well as a hash index into the linked list that is hashed on the ID of the in-memory data page that the log record applies to.

The current estimated recovery time, $R_{est}$, starts at 0 at system boot time. As each new log record is generated, its type is added to the tail of the linked list, its corresponding memory page ID is added to the hash index (which in turn points to the entry in the linked list), and the estimated time to replay it is added to $R_{est}$.

As dirty pages are flushed by page flushers, their hash index entries are used to find their entry in the linked list, and these entries are marked as flushed. Finally, if the oldest (head) entry on the linked list is marked as flushed, a scan is performed on the list from the oldest end. The scan stops when it reaches the first entry that is not flushed. This entry then represents the new start of log replay to employ in the event of a crash. For all of the entries encountered before the first un-flushed entry in the scan, the list entry and its corresponding hash entry are removed, and the estimated time to replay that entry's type of log record is subtracted from $R_{est}$.

In this manner, the CR system 50 has an up-to-date recovery time estimate, $R_{est}$, at all times. Note that because the estimated recovery times for each type of log record are captured from actual recovery events, this approach permits the CR system 50 to provide extremely accurate estimates that match the exact workload, hardware configuration, database configuration, etc., of the particular DBMS 10, and $R_{est}$ adapts over time—especially if a decaying or windowed average is used in the statistics.

Returning briefly to step 114 of FIG. 4, since the statistics used to calculate $R_{est}$ are developed over time, the CR system 50 still needs a set of initial estimates for each type of log record when it is first installed. Any reasonable set of guesses can be used for this, since the CR system 50 is self adapting, but more sophistication can also be applied. The inventors prefer to run a small sample workload (i.e., to run optional step 106) that generates a few of each type of log record, and then go through crash recovery for that sample log. This sample workload can be run automatically, behind the scenes, at database creation time to populate the CR system 50 with initial statistics. Such a workload typically should only take a few seconds to run.

Turning now also to step 112 of FIG. 4, the CR system 50 here employs the maximum tolerable recovery time, $R_{max}$, that has typically been provided as a configuration parameter by the user of the DBMS 10 in step 114.

As described above, the current estimated recovery time, $R_{est}$, is continually kept current, and the goal is to guarantee that it never becomes greater than $R_{max}$. The inventors' presently preferred approach to doing this is to define estimated recovery time threshold values x and y, where $0<x<y<R_{max}$. The values for x and y split the allowable range of recovery times into three intervals where the current $R_{est}$ may fall. The first interval ($I_1$) is then used for performance-oriented flushing; the second interval ($I_2$) is used for recovery time-oriented flushing; and the third interval ($I_3$) is used for emergency flushing. Algebraically, $I_1: 0 <= R_{est} < x$ $I_2: x <= R_{est} < y$ $I_3: y <= R_{est} <= R_{max}$ In the inventors' experience, x and y should preferably be close to $R_{max}$, for example, $x=0.90*R_{max}$ and $y=0.95*R_{max}$.

While $R_{est}$ is in the first interval, $I_1$, the normal background dirty page flushing algorithm of the DBMS 10 is used. Such algorithms are typically designed to maximize performance. An example is a least-recently-used (LRU) page flushing algorithm. In the first interval, $I_1$, this type of page flushing algorithm is appropriate.

If $R_{est}$ enters the second interval, $I_2$, however, this means that the estimated recovery time, $R_{est}$, is unacceptably increasing toward the maximum allowable time, $R_{max}$. In this interval, the background flushing algorithm is switched from a performance-oriented flushing algorithm to a flushing algorithm that is geared more toward reducing the recovery time. For instance, a first-in-first-out (FIFO) algorithm that flushes the dirty pages in the order in which they are dirtied is more suitable now. The recovery time, which $R_{est}$ is estimating, is now dominated by the time it takes to replay the log from the oldest un-flushed dirty page forward to the end of the log, so that flushing of the oldest dirty pages reduces the amount of log replay needed for recovery, thus reducing the recovery time and the current value of $R_{est}$.

In normal circumstances, $R_{est}$ should stay in the first interval, $I_1$, most of the time, with only occasional entry into the second interval, $I_2$. If the recovery time cannot be kept down even with the more aggressive flushing algorithm used in the second interval, $I_2$, and $R_{est}$ enters the third interval, $I_3$, then emergency flushing is performed. When $R_{est}$ is in the third interval, $I_3$, no further write operations are allowed to proceed until the background flushers (e.g., still using a FIFO algorithm) reduce $R_{est}$ back once again into the second interval, $I_2$. In other words, write activity in the DBMS 10 is momentarily blocked while the flushers catch up, to guarantee that the estimated recovery time, $R_{est}$, never goes above the user-specified maximum allowable recovery time, $R_{max}$.

The CR system 50 has the advantages of learning over time, automatically self-tuning, and taking into account the exact configuration of database, hardware, and workload in use by the DBMS 10. In real world scenarios, it would be impossible to assemble accurate tables of estimates for all possible combinations of parameters a priori (i.e., using a non-adaptive approach) for use in prior art crash recovery systems, and it would also be impossible for such systems to achieve comparable recovery time levels and accuracy with more generic qualitative estimates.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A method for limiting the amount of time for a database server to perform a crash recovery process, the method utilizing a computer processor to execute a plurality of steps comprising:

specifying a maximum recovery time demand for the database server to perform the crash recovery process;

during actual transaction processing dynamically calculating a current estimated recovery time for the crash recovery process, wherein said estimated recovery time is based on:
      a deterministic statistical analysis of cost accumulation for a log record type during prior instances of the crash recovery process; and
      an empirical analysis of cost accumulation for all log records corresponding to dirty pages during regular transaction processing in the database server, said empirical analysis using data from said statistical analysis;

during actual transaction processing dynamically selecting a page flushing algorithm in accordance with said calculated current estimated recovery time to meet said maximum recovery time demand, wherein when said estimated recovery time is less than a first threshold, the page flushing algorithm is set to improve transaction processing of the database server, when said estimated recover time is less than a second threshold, yet greater than said first threshold, the page flushing algorithm is set to improve recovery time of the database server; and when said estimated recovery time is greater than said second threshold, the page flushing algorithm is set to achieve maximum page flushing.

2. The method of claim 1, wherein the crash recovery process includes replaying log records stored in a transaction log, and wherein said calculating includes applying statistical data based on types of the log records and cost estimates associated with said types of the log records.

3. The method of claim 2, wherein said cost estimates are based on decaying weighted averages of observed costs.

4. The method of claim 1, wherein the database server employs page flushing algorithms and conforming the crash recovery to the estimated recovery time, including changing the page flushing algorithm the database server employs.

5. The method of claim 4, wherein said changing is done when said estimated recovery time crosses a pre-set threshold.

6. The method of claim 1 further comprising updating said estimated recovery time to perform crash recovery in a database management system as a log record is generating during transaction processing, the step of updating comprising:

during actual transaction processing determining a record type for the current log record;

retrieving an estimated record cost for said record type from a set of pre-stored statistical data; and adding said estimated record cost to the estimated recovery time.

7. The method of claim 6, further comprising adding said estimated record cost to an estimated page cost, wherein said estimated page cost represents a cost to replay the log records for a page in a buffer pool of the database management system.

8. The method of claim 7, further comprising maintaining a list of said estimated page costs for the pages in the buffer pool of the database management system.

9. The method of claim 1, further comprising updating said estimated recovery time to perform crash recovery in a database management system after a dirty page is flushed, the step of updating comprising:

during actual transaction processing retrieving an estimated page cost for the dirty page from a pre-stored set of said estimated page costs, wherein said estimated page cost is based on at least one of:

a deterministic analysis of cost accumulation during prior instances of crash recovery in the database management system; and an empirical analysis of cost accumulation during regular transaction processing in the database management system; and subtracting said estimated page cost from the estimated recovery time.

10. A computer program, embodied on a computer readable storage medium, for limiting the amount of time for a database server to perform a crash recovery process, comprising:

a code segment that permits a user to specify a maximum recovery time demand for the database server to perform the crash recovery process;

during transaction processing, a code segment that dynamically calculates a current estimated recovery time for the crash recovery process that is less than said maximum recovery time, wherein said estimated recovery time is based on at least one of:

a deterministic statistical analysis of cost accumulation for a log record type during prior instances of the crash recovery process; and an empirical analysis of cost accumulation for all log records corresponding to dirty pages during regular transaction processing in the database server, said empirical analysis using data from said statistical analysis; and during transaction processing, a code segment that dynamically selects a page flushing algorithm in accordance with the calculated current estimated recovery time to meet the maximum recovery time, wherein said code segment that conforms sets the page flushing algorithm to improve transaction processing of the database server when the estimated recovery time is less than a first threshold, said code segment that conforms sets the page flushing algorithm to improve recovery time of the database server when the estimated recovery time is less than a second threshold yet greater than said first threshold, and said code segment that conforms sets the page flushing algorithm to achieve maximum page flushing when said estimated recovery time is greater than said second said threshold.

11. The computer program of claim 10, wherein the crash recovery process includes replaying log records stored in a transaction log, and wherein said code segment that calculates applies statistical data base on types of the log records and cost estimates associated with said types of the log records.

12. The computer program of claim 10, wherein the database server employs page flushing algorithms and said code segment that conforms changes the page flushing algorithm the database server employs.

13. The computer program of claim 12, wherein said changing is done when said estimated recovery time crosses a pre-set threshold.

14. The computer program of claim 10 further comprising:

a code segment that updates said estimated recovery time to perform crash recovery in a database management system as a log record is generated during transaction processing, comprising:

during transaction processing, a code segment that determines a record type for the current log record;

code segment that retrieves an estimated record cost for said record type from a set of pre-stored statistical data;

a code segment that adds said estimated record cost for the estimated recovery time.

15. The computer program product of claim 14, further comprising a code segment that adds said estimated record cost to an estimated page cost, wherein said estimated page cost represents a cost to replay the log records for a page in a buffer pool of the database management system.

16. The computer program product of claim 15, further comprising a code segment that maintains a list of estimated page costs for the pages in the buffer pool of the database management system.

17. The computer program of claim 10, further comprising:

a code segment that updates said estimated recovery time to perform crash recovery in a database management system after a dirty page is flushed, comprising:

during transaction processing, a code segment that retrieves an estimated page cost for the dirty page from a pre-stored set of said estimated page costs, wherein said estimated page cost is based on at least one of:

a deterministic analysis of cost accumulation during prior instances of crash recovery in the database management system; and an empirical analysis of cost accumulation during regular transaction processing in the database management system; and a code segment that subtracts said estimated page cost from the estimated recovery time.

* * * * *